US006060807A

United States Patent [19]
Saito et al.

[11] Patent Number: 6,060,807
[45] Date of Patent: May 9, 2000

[54] ROTATING SHAFT SUPPORT MEMBER AND SMALL MOTOR

[75] Inventors: Kohichi Saito; Seiji Kawabata, both of Nagano, Japan

[73] Assignee: Seiko Epson Corporation, Japan

[21] Appl. No.: 08/952,049

[22] PCT Filed: Feb. 13, 1997

[86] PCT No.: PCT/JP97/00393

§ 371 Date: Feb. 25, 1998

§ 102(e) Date: Feb. 25, 1998

[87] PCT Pub. No.: WO97/30507

PCT Pub. Date: Aug. 21, 1997

[30] Foreign Application Priority Data

Feb. 15, 1996 [JP] Japan ........................... 8-28270

[51] Int. Cl.[7] .................................................. H02K 5/00
[52] U.S. Cl. ........................ 310/91; 310/43; 310/40 MM
[58] Field of Search .................................. 310/91, 90, 43, 310/40 MM; 384/428, 226, 371

[56] References Cited

U.S. PATENT DOCUMENTS

| | | | |
|---|---|---|---|
| 3,583,778 | 6/1971 | Mori ......................................... | 384/471 |
| 4,086,510 | 4/1978 | Watanabe ................................. | 310/242 |
| 5,268,607 | 12/1993 | McManus ................................. | 310/89 |
| 5,399,025 | 3/1995 | Higuchi et al. .......................... | 384/428 |
| 5,427,712 | 6/1995 | Nakamura et al. ................. | 252/299.01 |
| 5,486,728 | 1/1996 | Hirama .............................. | 310/40 MM |
| 5,643,988 | 7/1997 | Nakamura et al. ..................... | 524/449 |
| 5,644,180 | 7/1997 | Buchannan, Jr. ......................... | 310/90 |
| 5,731,373 | 3/1998 | Hirose et al. ............................ | 524/477 |
| 5,804,634 | 9/1998 | Umetsu et al. .......................... | 524/466 |

FOREIGN PATENT DOCUMENTS

| | | |
|---|---|---|
| 57-62749 | 4/1982 | Japan . |
| 2-136053 | 5/1990 | Japan . |
| 3-159534 | 7/1991 | Japan . |
| 8-275481 | 10/1996 | Japan . |

OTHER PUBLICATIONS

Microfilm of the specification and drawings annexed to the written application of Japanese Utility Model App. No. 84403/1981 (Laid–open No. 195354/1982) (Sanyo Electric Co., Ltd., Sanyo Seimitsu Co., Ltd.), Dec. 10, 1982.

Microfilm of the specification and drawings annexed to the written application of Japanese Utility Model Application No. 80055/1984 (Laid–open No. 192683/1985) (Fuji Electrochemical Co., Ltd.), Dec. 21, 1985.

Microfilm of the specification and drawings annexed to the written application of Japanese Utility Model Appl. No. 78269/1984 (Laid–open No. 190159/1985) (Canon Inc., Canon Precision Inc.), Dec. 17, 1985.

(List continued on next page.)

*Primary Examiner*—Nestor Ramirez
*Assistant Examiner*—Joseph Waks
*Attorney, Agent, or Firm*—Harness, Dickey & Pierce, P.L.C.

[57] ABSTRACT

An object of the present invention is to provide a rotating shaft support member which permits a reduced number of parts, simpler assembly operation, and improved dimensional accuracy, and also to provide a small motor equipped with the same. To this end, a rotating shaft support member (1) according to the present invention is constituted by a nearly circular bracket main body (2) wherein an outer peripheral wall (3) is provided on the outer periphery thereof, and a bearing unit (4) which rotatably supports an end of the rotating shaft of a rotor is formed integrally with the bracket main body (2). The bearing unit 4 has a shaft bore (41) in which the rotating shaft is inserted. The shaft bore (41) has an inner peripheral surface (42) in contact with the outer peripheral surface of the rotating shaft and a bottom surface (43) against which an end surface of the rotating shaft is held. Further, a pair of through holes (5) through which lead wires are passed are formed in the bracket main body (2). The bracket main body (2) is manufactured by injection molding by using, for example, a liquid crystal polymer.

5 Claims, 4 Drawing Sheets

OTHER PUBLICATIONS

Microfilm of the specification and drawings annexed to the written application of Japanese Utility Model No. 62059/1979 (Laid–open No. 162359/1980) (Matsushita Electric Industrial Co., Ltd.), Nov. 21, 1980.

JP, 64–30435, A (Fuji Electrochemical Co., Ltd.), Feb. 1, 1989.

Microfilm of the specification and drawings annexed to the written application of Japanese Utility Model App. No. 31848/1993 (Laid–open No. 88158/1994) (Asian Industry Co., Ltd.), Dec. 22, 1994.

Microfilm of the specification and drawings annexed to the written application of Japanese Utility Model App. No. 142086/1981 (Laid–open No. 46258/1983) (Matsushita Electric Industrial Co., Ltd.), Mar. 29, 1983.

ROTATING SHAFT SUPPORT MEMBER AND SMALL MOTOR

FIELD OF THE INVENTION

The present invention relates to a rotating shaft support member and a small motor equipped with the same.

RELATED ART

A motor has a casing, a stator and a rotor. The stator and rotor are installed in the casing wherein the rotor is rotatably supported by the brackets installed at both ends of the casing. In this case, the rotating shaft of the rotor is supported by dedicated oil-retaining bearings composed of a sintered metal impregnated with, for example, 18 vol % of a lubricant, and the bearing are fitted in and fixed at the center inside the resinous brackets.

Such a configuration, however, poses a problem in that the brackets and bearings, which are separate members, are assembled and the number of the components accordingly increases, requiring time and effort for the assembling operation, especially for positioning the bearings relative to the brackets.

In recent years, the development of small motors used in, for example, pager units, portable telephones, cameras, and portable tape recorders has progressed, and with the trend toward smaller motors, the components including rotors, brackets, and bearings are accordingly becoming smaller.

Higher accuracy in the dimensions, positioning, etc. of constituent parts which have been assembled is required of such small motors as compared with large- or medium-sized motors. As mentioned above, in the rotating shaft support member for supporting the rotating shaft, the bearings, which are separated parts from the brackets, are incorporated in the brackets; hence, there is a problem with assembling accuracy, that is, the positioning accuracy or the like of a shaft bore is deteriorated.

In view of the foregoing problems, it is an object of the present invention to provide a rotating shaft support member which permits the number of parts to be reduced and assembly operation to be simplified and also enables improved dimensional accuracy, and also to provide a small motor equipped with the same.

DISCLOSURE OF THE INVENTION

To solve the foregoing problems, according to the present invention, there is provided a rotating shaft support member which supports a rotating shaft and which has a bracket main body, wherein bearing units which rotatably support the ends of the rotating shaft are formed integrally with the bracket main body.

According to the rotating shaft support member and the small motor in accordance with the present invention, the bearing units formed as integral parts of the bracket main body make it possible to reduce the number of parts and to simplify the assembly operation.

Further, when at least the bearing units of the bracket main body are composed of a resin having lubricating properties which is represented by a liquid crystal polymer, the sliding resistance of the rotating shaft with respect to a shaft bore is reduced, enabling reduced loss in motor torque. In particular, composing the bearing units by using a liquid crystal polymer permits improved quietness while the motor is running, and better durability and better formability of the bearing units, and also makes it possible to obtain molded articles with extremely high dimensional accuracy of each component and especially of the inside diameter and depth of the shaft bore.

Furthermore, when a through hole for passing a lead wire therethrough is formed in the bracket main body and when the through hole has a portion where the inside diameter thereof gradually increases toward the inside of the bracket main body, the holding force for the lead wire passed through the through hole can be improved, preventing the lead wire from being slipped off.

BEST MODE FOR CARRYING OUT THE INVENTION

A rotating shaft support member and a smaller motor in accordance with the present invention will now be described in detail in conjunction with the preferred embodiments shown in the accompanying drawings.

Figure 1:
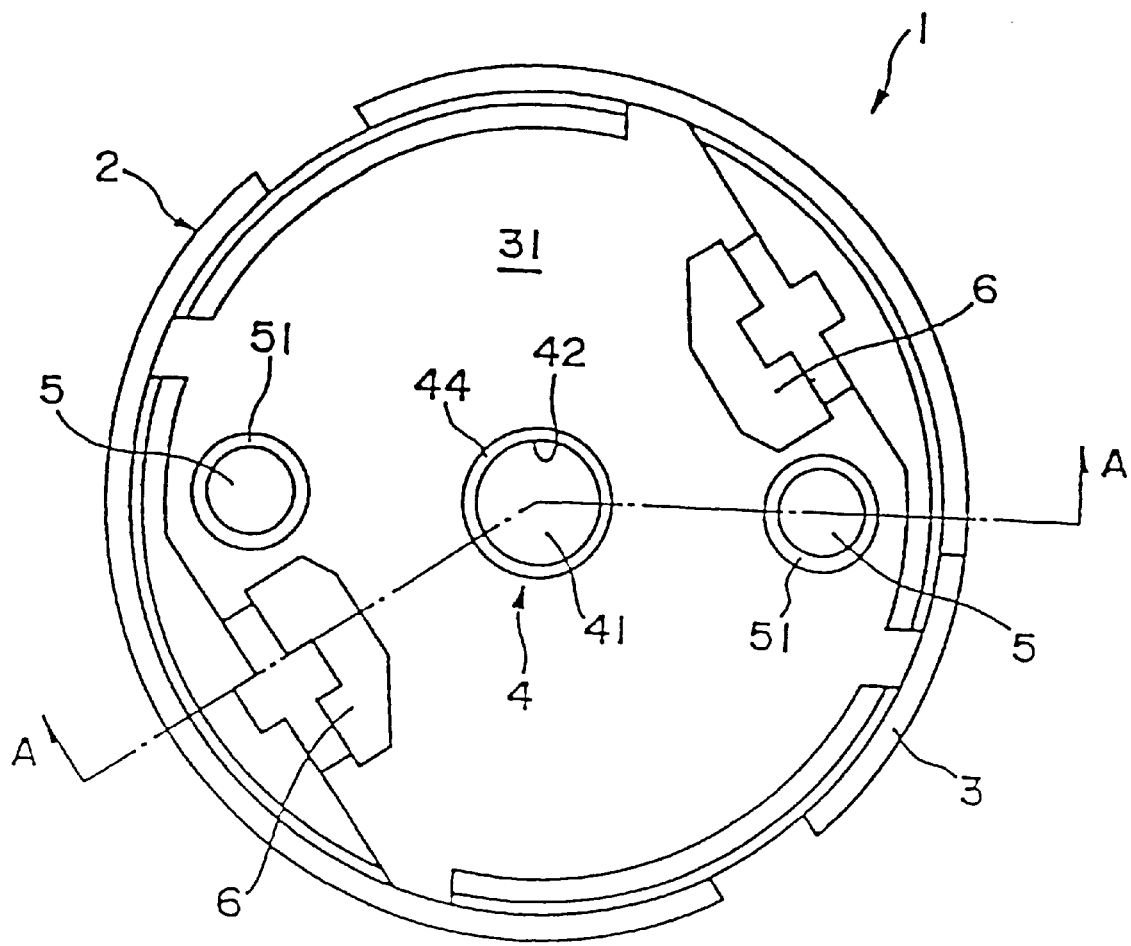
FIG. 1 is a top plan view illustrating an embodiment of a rotating shaft support member in accordance with the present invention.
Figure 2:
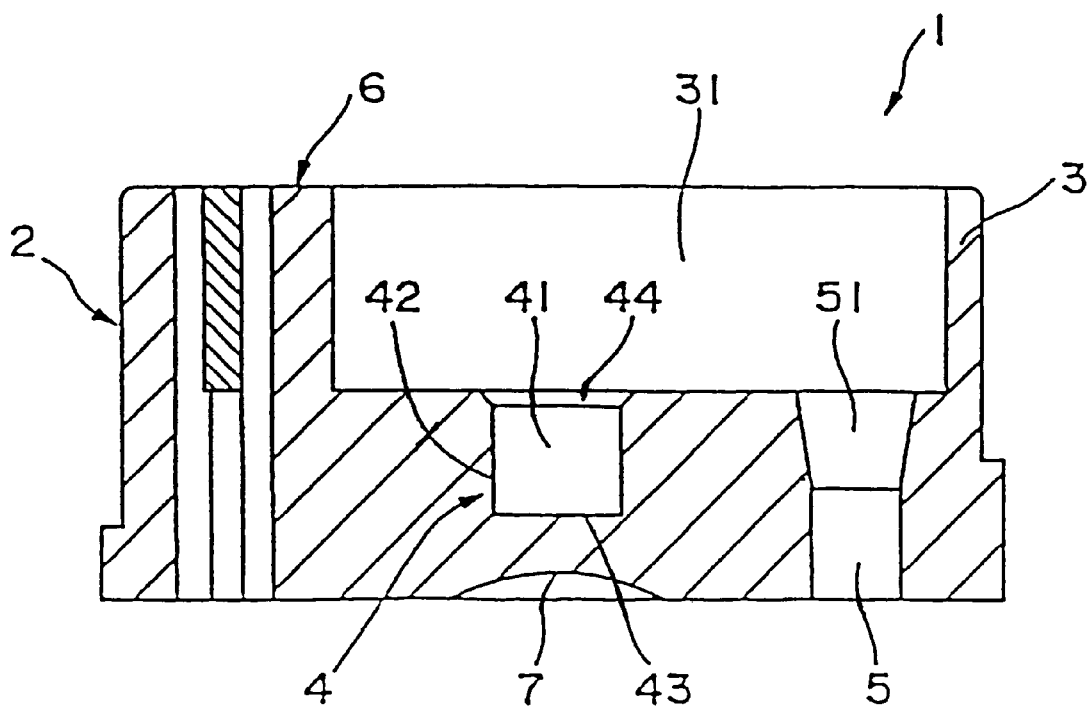
FIG. 2 is a cross-sectional view at the line A—A of FIG. 1.
Figure 3:
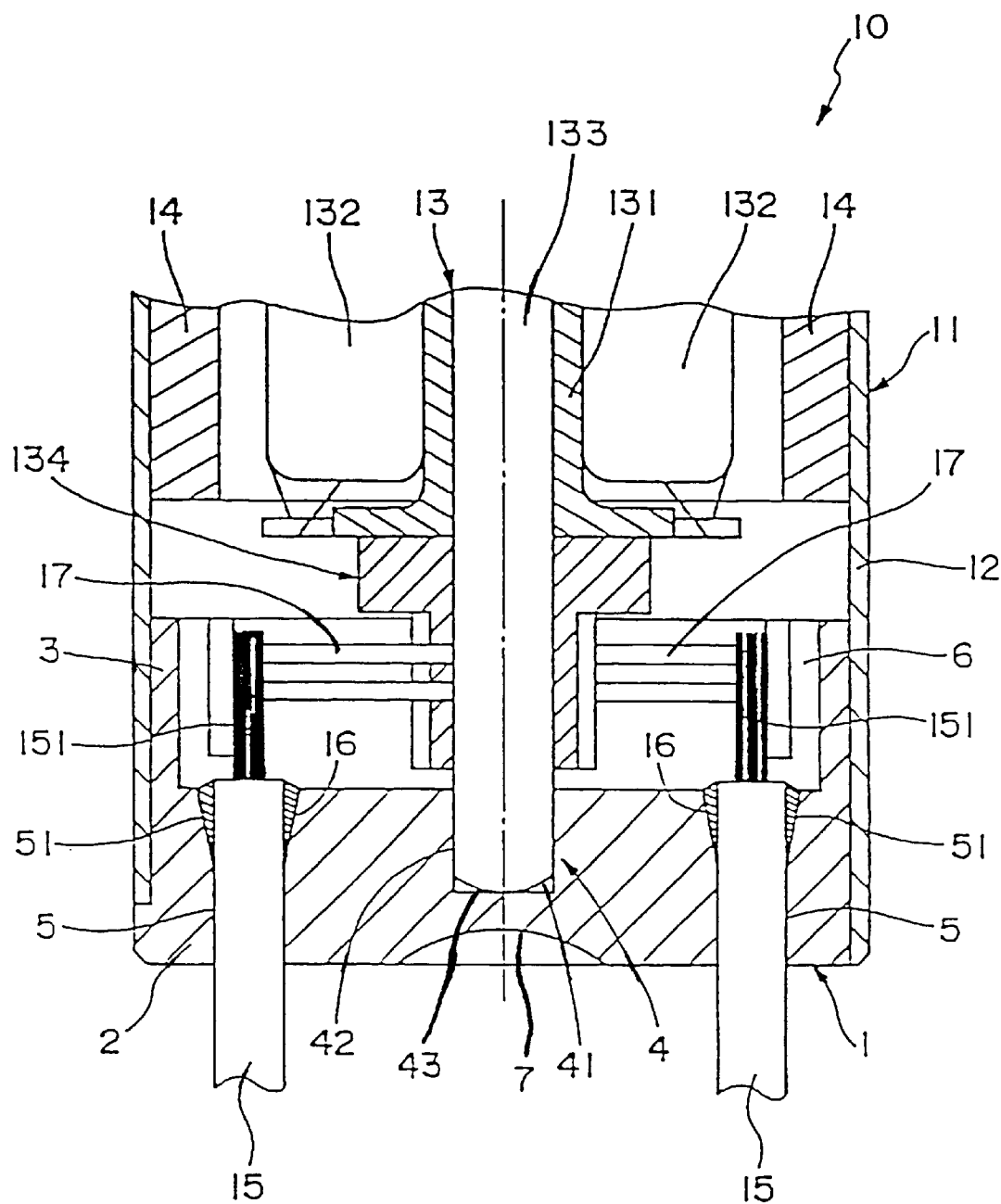
FIG. 3 is a partial longitudinal sectional view illustrating an embodiment of a small motor in accordance with the present invention.

FIG. 1 is a top plan view showing an embodiment of the rotating shaft support member; FIG. 2 is a cross-sectional view at the line A—A of FIG. 1; and FIG. 3 is a partial longitudinal sectional view illustrating an embodiment of the small motor in accordance with the present invention. First, the rotating shaft support member in accordance with the present invention will be described in conjunction with FIG. 1 and FIG. 2.

As shown in FIG. 1, a rotating shaft support member 1 according to the present invention is composed of a bracket main body 2 which is nearly circular. An outer peripheral wall 3 is provided on the outer periphery of the bracket main body 2; at the central portion of the bracket main body 2, a bearing unit 4 which rotatably supports an end of a rotating shaft 133 of a rotor 13, which will be discussed later, is formed integrally with the bracket main body 2.

The bearing unit 4 has a shaft bore 41 in which the rotating shaft 133 of the rotor 13 is inserted. The shaft bore 41 has an inner peripheral surface 42 in contact with the outer peripheral surface of the rotating shaft 133 and a bottom surface 43 abutting an end surface of the rotating shaft 133; it is opened to (in communication with) a space 31 surrounded by the outer peripheral wall 3. In this embodiment, the inner peripheral surface 42 constitutes a cylindrical surface, the inside diameter of which is almost constant in the axial direction; and the bottom surface 43 constitutes a plane.

Formed at the top of the inner peripheral surface 42 of the shaft bore 41 in FIG. 2 is a tapered surface (guiding surface) 44 which diverges toward the space 31 to permit easy insertion of the rotating shaft 133.

There is no particular restrictions on the dimension of the shaft bore 41; however, if the rotating shaft support member 1 is employed for a small motor, then the inside diameter of the inner peripheral surface 42 of the shaft bore 41 is preferably about 0.3 to about 1.5 mm, more preferably about 0.6 to about 0.8 mm, and the depth of the shaft bore 41 is preferably about 0.5 to about 1.5 mm and more preferably about 0.6 to about 0.8 mm.

In the present invention, the shape of the shaft bore 41 is not limited to that shown in the figure; for example, the shape may alternatively be a tapered surface or a surface having a step which is formed by all or a part of the inner peripheral surface 42 with the inside diameter thereof gradually increases toward the space 31; and the bottom surface 43 may be a surface which has a convex or concave curved surface or a surface having a step.

In the bracket main body 2, a pair of through holes 5 which penetrate the bracket main body 2 are formed at the positions opposed to each other with the bearing unit 4 serving as the midpoint therebetween. Lead wires 15 which supply electric power for rotationally driving the rotor 13 are passed through these through holes 5.

The inside diameter of the bottom portions of the through holes 5 shown in FIG. 2 is set so that it is equal to or slightly larger than the outside diameter of the lead wires 15 provided with sheaths; it is made constant in the axial directions of the through holes 5. Formed at the top of the through holes 5 shown in FIG. 2 are portions having an inside diameter which gradually increases toward the space 31 inside the bracket main body, namely, tapered portions 51 which diverge toward the space 31. The tapered portions 51 constitute the adhesive agent reservoirs that are filled with an adhesive agent 16, which will be discussed later, with the lead wires 15 passed through the through holes 5; however, they are not necessarily filled with the adhesive agent 16 or other fixing member.

Beside one side of each of the through holes 5, a brush fixing section 6 for fixing a brush 17, which will be discussed later, is formed integrally with the bracket main body 2.

The foregoing bracket main body 2 is preferably composed of a resin material which intrinsically has lubricating properties and, more particularly, a resin material which has a relatively low coefficient of friction and wear resistance.

Such materials include, for example, liquid crystal polymer (LCP), polytetrafluoroethylene, polyphenylenesulfide (PPS), polyamide, polyimide, polyacetal, and polycarbonate; an especially preferred material contains a liquid crystal polymer as the principal ingredient.

A liquid crystal polymer has high mechanical strength, a low coefficient of friction, and high wear resistance, thus making it advantageous for the rotating shaft 133 to slide against the inner peripheral surface 42 or the bottom surface 43 of the shaft bore 41; it is especially effective for suppressing sliding noises or vibration noises, so that it contributes to improved quietness. Moreover, a liquid crystal polymer exhibits high fluidity when it melts and has good formability when the bracket main body 2 is manufactured by, for example, injection molding; hence, a liquid crystal polymer is suited also for forming, for example, a minute and complicated shape, or a thin part such as the outer peripheral wall 3, and it develops fewer burrs. Further, a liquid crystal polymer shows less structural difference between solid and melt, so that the mold shrinkage factor is low, thus making it possible to obtain moldings with extremely high dimensional accuracy of every component, particularly the inside diameter and depth of the shaft bore 41.

Liquid crystal polymers are classified into type I, type II, and type III according to the thermal deformation temperature thereof, among which liquid crystal polymers of type II (the thermal deformation temperature is about 200 to 300 degrees Celsius) are especially preferable because they show the foregoing advantage more markedly. As a specific example of the type II liquid crystal polymer suitably used is Vectra (trade name) made by Polyplastics.

The constituent material for the bracket main body 2 is not limited to a liquid crystal polymer alone; it may be a copolymer of a liquid crystal polymer and other polymer, a polymer blend or polymer alloy containing a liquid crystal polymer, etc. Further, for various purposes, diverse additives such as a filler and a pigment may be added to the material. For instance, adding a filler (e.g. an inorganic filler such as graphite, glass fiber, etc.) is advantageous for easing the anisotropy of a liquid crystal polymer.

The constituent material of the bracket main body 2 represented by the foregoing liquid crystal polymers preferably has a mold shrinkage factor of 0.5% or less. This enables the formation of the shaft bore 41 having extremely high dimensional accuracy.

It is also preferable that the bracket main body 2 is fabricated by injection molding. The injection molding makes it possible to manufacture the bracket main body 2 having a complicated shape with good dimensional accuracy and high productivity.

Figure 4:
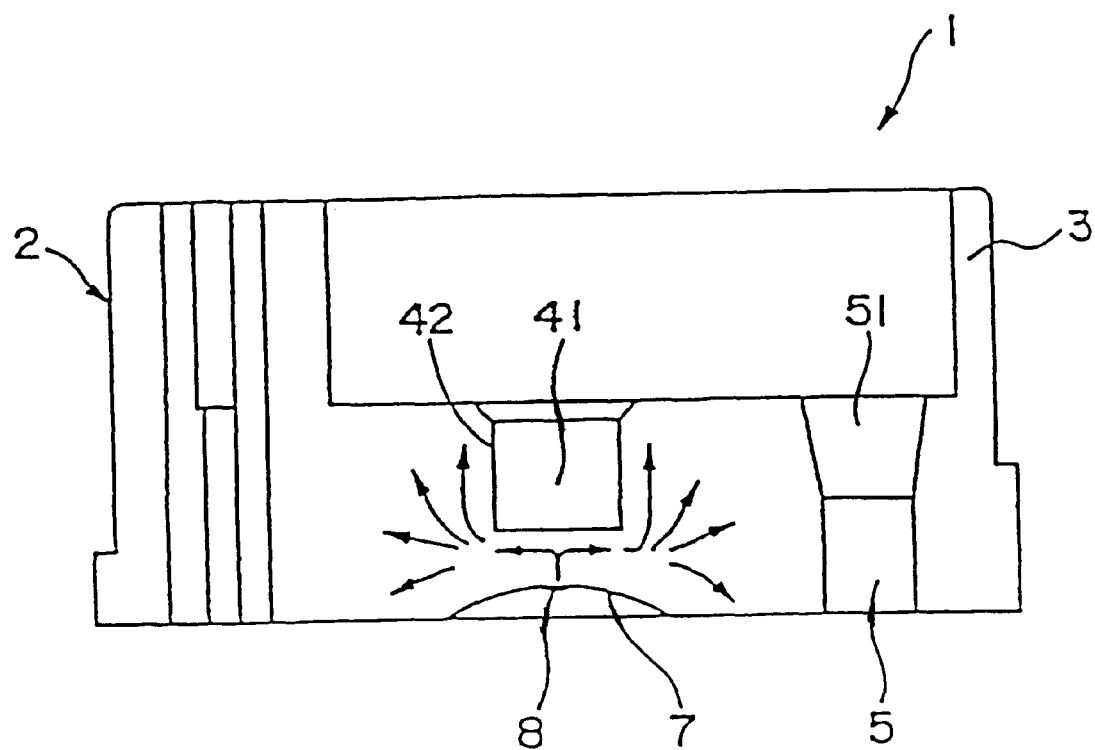
FIG. 4 is a schematic diagram showing the flow of resin observed when the rotating shaft support member is manufactured by injection molding.

As shown in FIG. 4, the bracket main body 2 manufactured by injection molding is preferably provided with a gate trace (position where resin is injected) 8 which is formed near the bottom of the shaft bore 41 of the bracket main body 2. In this embodiment, a dish-shaped depression 7 is formed at a position on the extension of the shaft bore 41 at the bottom surface of the bracket main body 2; the gate trace 8 is formed in the depression 7, specifically near the center of the depression 7 (at a position which approximately aligns with the axis of the shaft bore 41).

Thus, resin flows as indicated by the arrows in FIG. 4 at the time of injection-molding the bracket main body 2; more specifically, the resin evenly flows radially around with the shaft bore 41 being the center of the flow, and a part of the resin flows upward in FIG. 4 in the direction of the axis along the inner peripheral surface 42 of the shaft bore 41; hence, the dimensional accuracy of the shaft bore 41 is extremely high, enabling specifically the cross section of the shaft bore 41 to be shaped to a perfect circle.

The dimension of the bracket main body 2 is not limited in particular; however, if it is used for a small motor which will be discussed later, then the outside diameter of the bracket main body 2 is preferably about 2 to about 15 mm and more preferably about 2 to about 6 mm.

An embodiment of the small motor in accordance with the present invention which is equipped with the rotating shaft support member 1 will now be described in conjunction with FIG. 3.

A small motor 10 in accordance with the present invention shown in FIG. 3 is a DC motor; it has a cylindrical trunk 12 and a casing 11 comprised of rotating shaft support members attached to both ends of the trunk 12. In this case, the rotating shaft support member on the side of the bottom end of the casing 11 in FIG. 3 is the rotating shaft support member 1 mentioned previously, while the rotating shaft support member (not shown) on the side of the top end in FIG. 3 is the same as the rotating shaft support member 1 except that it is not provided with the through holes 5 and the brush fixing sections 6.

Further, in the casing 11, the rotor 13 is rotatably supported by both rotating shaft support members 1. The rotor 13 is comprised of a core 131, a pair of exciting coils 132 formed by providing the core 131 with a winding, the rotating shaft 133 fitted at the center of the core 131, and a commutator 134; both ends of the rotating shaft 133 are respectively inserted in the shaft bores 41 of the rotating shaft support members 1 so as to be rotatably supported with respect to the casing 11.

The end surface of the rotating shaft 133 constitutes a curved convex surface which is in contact with the bottom surface 43 of the shaft bore 41 through a small area (point contact). This reduces the frictional force when the rotor 13 rotates.

As the constituent material for the rotating shaft 133, a material which has high strength and a low coefficient of friction is preferred, such as a metal material including stainless steel (SUS) and bearing steel (SUJ) or ceramics.

Further, in order to reduce the frictional resistance produced when the rotor 13 rotates, it is preferable that the portion in contact with at least the shaft bore 41 of the rotating shaft 133 is provided with smoothing treatment (treatment for reducing the roughness of the surface).

The commutator 134 has a structure wherein a pair of commutator pieces which are isolated from each other are disposed against each other; the respective commutator pieces are electrically connected to corresponding exciting coils 132. This causes commutation at every 180 degrees of rotational angle when the rotor 13 rotates.

On the outer periphery of the portion where the exciting coils 132 of the rotor 13 are disposed, permanent magnets (stator magnets) 14 fixed on the inner surface of the trunk 12 are installed as stators. The permanent magnets 14 may be either cylindrical magnets or segment type (split type) magnets.

There are no particular restrictions on the magnetic material constituting the permanent magnets 14; however, it is preferred to use a magnetic material which contains a rare earth element and a transition metal (e.g. SmCo type magnet, R—Fe—B type magnet ("R" is a rare earth element containing Y) because it exhibits good magnetic properties.

There are no particular restrictions on the type of the permanent magnets 14; they may be any of sintered magnets, cast magnets, resin-bonded magnets, etc., however, they are preferably resin-bonded magnets because of the good formability, etc. thereof.

The lead wires 15 are respectively inserted in both through holes 5 of the rotating shaft support member 1 located at the bottom in FIG. 3; these lead wires 15 are glued and fixed to the bracket main body 2 by filling the tapered portions 51 with the adhesive agent 16. The through holes 5 are provided with the tapered portions 51, so that the solidified adhesive agent 16 produces an operation similar to that of a wedge to prevent disconnection caused by the lead wires 15 slipping out of the through holes 5.

The brushes 17 composed of metallic sheet strips are respectively fixed on both fixing sections 6 of the rotating shaft support member 1 positioned at the bottom side in FIG. 3. The proximal ends of the respective brushes 17 are soldered to the metal wires 151 exposed from the corresponding lead wires 15. The distal ends (the ends on the side of the center of the bracket main body 2) of the respective brushes 17 are in contact with the outer periphery of the commutator 134 at the locations which are shifted from each other by a rotational angle of 180 degrees.

Thus, when direct current is supplied to both brushes 17 through both lead wires 15, the respective exciting coils 132 are excited to cause the rotor to rotate in a predetermined direction, and the operation of the commutator 134 causes commutation at every 180 degrees, thereby continuing the rotation of the rotor 13.

In the foregoing small motor 10, the inner peripheral surface 42 and the bottom surface 43 of the shaft bore 42 supporting the rotating shaft 133 have low friction and good wear resistance, thus eliminating the need for filling the shaft bore 42 with lubricant. Hence, oil does not move along the outer peripheral surface of the rotating shaft 133 to adhere the commutator 134, etc. as it used to do in a case where a conventional oil-impregnated bearing is employed, so that it is possible to prevent deterioration in the performance of the motor caused by contact failures, the adhesion of dust, etc. attributable to oil. In addition, it is unnecessary to consider the replenishment of lubricant or the like, permitting easy maintenance.

The small motor in accordance with the present is not limited to a DC motor; it may alternatively be a single-phase AC motor or other phase AC motor.

The rotating shaft support member and the small motor according to the present invention have been described in conjunction with the embodiment shown in the figures. The present invention, however, is not limited thereto; for example, the shape of the entire rotating shaft support member or the shapes of the respective sections thereof, the disposition of the rotating shaft support member in the small motor, the number, the shape, and the dimension of the rotor, etc. are not limited to those of the foregoing embodiment.

INDUSTRIAL APPLICABILITY

The small motor in accordance with the present invention can be applied to a pager unit, portable telephone, camera, portable tape recorder, etc.

We claim:

1. A small motor comprising:

a casing having an end section;
a rotating shaft support member having a top surface, a bottom surface and side walls defining a cavity with a lower surface, said lower surface having a generally cylindrical bore integrally formed therein with side walls and a bottom defining a shaft receiving bearing portion, with the side walls of the shaft support member being affixed to the end section of the casing;
a rotating shaft having an end engaging the bearing portion;
a rotor coupled to the shaft;
a stator surrounding the rotor;
said rotating shaft support member being integrally formed from a resinous material having lubricating properties thereby eliminating the need for oil for lubrication of the shaft;
at least one hole in the rotating shaft support member adjacent the bearing portion, said hole having a diverging portion;
a lead wire passing through the hole; and
an adhesive in the diverging portion to secure the lead wire in the hole.

2. The motor of claim 1 wherein the resinous material comprises a liquid crystal polymer.

3. The motor of claim 1 wherein the bottom surface of the rotating support member includes an indentation located under the bearing portion into which the resinous material is injected by injection molding.

4. A small motor comprising:

a casing having an end section;

a rotating shaft support member having a top surface, a bottom surface and side walls defining a cavity with a lower surface, said lower surface having a generally cylindrical bore therein with side walls and a bottom defining a shaft receiving bearing portion, with the side walls of the shaft support member being affixed to the end section of the casing;

a rotating shaft having an end received by the bearing portion;

at least one hole in the rotating shaft support member adjacent the bearing portion, said hole having a diverging portion;

a lead wire passing through the hole;

an adhesive in the diverging portion to secure the lead wire in the hole; and said rotating shaft support member being integrally formed from a resinous material having lubricating properties thereby eliminating the need for oil for lubrication of the shaft.

5. The motor of claim 4 wherein the end of the rotating shaft is convexly shaped to reduce an area of contact between the bearing portion and the shaft.

* * * * *